(12) United States Patent
Nakazono et al.

(10) Patent No.: US 8,792,151 B2
(45) Date of Patent: Jul. 29, 2014

(54) OPTICAL REFLECTION ELEMENT

(75) Inventors: Shinsuke Nakazono, Osaka (JP); Toshiaki Horie, Osaka (JP); Shigeo Furukawa, Osaka (JP); Kiyomi Furukawa, legal representative, Osaka (JP); Soichiro Hiraoka, Hyogo (JP); Yuta Yamamoto, Osaka (JP); Masaki Tada, Osaka (JP); Kazuki Komaki, Osaka (JP)

(73) Assignee: Panasonic Corporation, Osaka (JP)

( * ) Notice: Subject to any disclaimer, the term of this patent is extended or adjusted under 35 U.S.C. 154(b) by 155 days.

(21) Appl. No.: 13/581,360

(22) PCT Filed: Mar. 24, 2011

(86) PCT No.: PCT/JP2011/001721
§ 371 (c)(1),
(2), (4) Date: Aug. 27, 2012

(87) PCT Pub. No.: WO2011/121945
PCT Pub. Date: Oct. 6, 2011

(65) Prior Publication Data
US 2013/0050791 A1    Feb. 28, 2013

(30) Foreign Application Priority Data
Mar. 30, 2010    (JP) .................................. 2010-078443

(51) Int. Cl.
*G02B 26/08*    (2006.01)

(52) U.S. Cl.
CPC ............ *G02B 26/0858* (2013.01); *G02B 26/08* (2013.01); *G02B 26/0841* (2013.01); *G02B 26/085* (2013.01)
USPC .................. 359/199.3; 359/199.1; 359/199.2; 359/199.4

(58) Field of Classification Search
CPC ............. G02B 26/0841; G02B 26/105; G02B 26/0833; G02B 26/085; G02B 26/0858; G02B 26/101
USPC .......... 359/198.1–199.4, 200.6–200.8, 221.2, 359/224.1–224.2
See application file for complete search history.

(56) References Cited

U.S. PATENT DOCUMENTS

| 8,654,426 B2 * | 2/2014 | Yamada ..................... 359/212.1 |
| 2010/0296147 A1 | 11/2010 | Terada et al. |
| 2011/0032590 A1 | 2/2011 | Terada et al. |
| 2012/0243065 A1 * | 9/2012 | Koyama ..................... 359/199.4 |

FOREIGN PATENT DOCUMENTS

| JP | 2003-315701 | 11/2003 |
| JP | 2008-35600 | 2/2008 |
| JP | 2009-80379 | 4/2009 |

(Continued)

OTHER PUBLICATIONS

International Search Report of PCT Application No. PCT/JP2011/001721 dated May 17, 2011.

*Primary Examiner* — James Phan
(74) *Attorney, Agent, or Firm* — Panasonic Patent Center

(57) ABSTRACT

An optical reflection element includes a frame, a meandrous vibrating part having an outer end connected with an inside of the frame, and a mirror part supported by an inner end of the meandrous vibrating part. The meandrous vibrating part has a meandrous shape that includes curved portions and vibrating beams alternately connected with the curved portions. A curvature of respective one of the curved portions is smaller than a curvature of at least one of the curved portions which is located closer to the inner end than the respective one of the curved portions. This optical reflection element has a large deflection angle of the mirror part.

12 Claims, 6 Drawing Sheets

(56) References Cited

FOREIGN PATENT DOCUMENTS

| | | |
|---|---|---|
| JP | 2009-093120 | 4/2009 |
| JP | 2009-169290 | 7/2009 |
| JP | 2009-192967 | 8/2009 |
| JP | 2009-258210 | 11/2009 |
| JP | 2009-265362 | 11/2009 |

* cited by examiner

FIG. 1

OPTICAL REFLECTION ELEMENT

TECHNICAL FIELD

The present invention relates to an optical reflection element for use in an image projector, such as a head-up display or a head-mounted display.

BACKGROUND ART

A piezoelectric-driven optical reflection element capable of securing a predetermined deflection angle of a mirror part thereof even when a high-frequency driving section thereof operates at higher frequencies for increasing resolution of a projected image has been desired.

As a way to meet the demand, an optical reflection element including a meandrous vibrating part is known.

FIG. 6 is a perspective view of conventional optical reflection element 501 described in Patent Literature 1. High-frequency driving section 502 of optical reflection element 501 includes mirror part 30, a pair of meandrous vibrating parts 31 that face each other across mirror part 30, and frame 32 that surrounds mirror part 30 and the pair of meandrous vibrating parts 31. One end of each of the pair of meandrous vibrating parts 31 is connected with mirror part 30. The other end of each of the pair of meandrous vibrating parts 31 is connected with frame 32. Driving sections are disposed on each of meandrous vibrating parts 31. Each of the driving sections includes a lower electrode, a piezoelectric body disposed on the lower electrode, and an upper electrode disposed on the piezoelectric body. An alternating-current (AC) voltage applied to the piezoelectric body via the lower electrode and the upper electrode resonance drives mirror part 30 connected with the one end of respective meandrous vibrating parts 3, thereby causing mirror part 30 to rotate back and forth.

The meandrous shape of vibrating parts 31 of high-frequency driving section 502 allows the displacement of vibrating parts 31 to accumulate. In addition, the resonant driving increases a deflection angle of mirror part 30 with a lower voltage, thereby providing a predetermined deflection angle.

In conventional optical reflection element 501, in order to cause mirror part 30 to rotate back and forth largely, curved portions of meandrous vibrating parts 31 may break, thus hardly increasing the deflection angle of mirror part 30.

CITATION LIST

Patent Literature

Patent Literature 1: Japanese Patent Laid-Open Publication No. 2009-93120

SUMMARY OF THE INVENTION

An optical reflection element includes a frame, a meandrous vibrating part having an outer end connected with an inside of the frame, and a mirror part supported by an inner end of the meandrous vibrating part. The meandrous vibrating part has a meandrous shape that includes curved portions and vibrating beams alternately connected with the curved portions. A curvature of respective one of the curved portions is smaller than a curvature of at least one of the curved portions which is located closer to the inner end than the respective one of the curved portions.

This optical reflection element has a large deflection angle of the mirror part.

BRIEF DESCRIPTION OF THE DRAWINGS

FIG. 1 is a perspective view of an optical reflection element according to Exemplary Embodiment 1 of the present invention.

DETAIL DESCRIPTION OF PREFERRED EMBODIMENTS

Exemplary Embodiment 1

Figure 1:
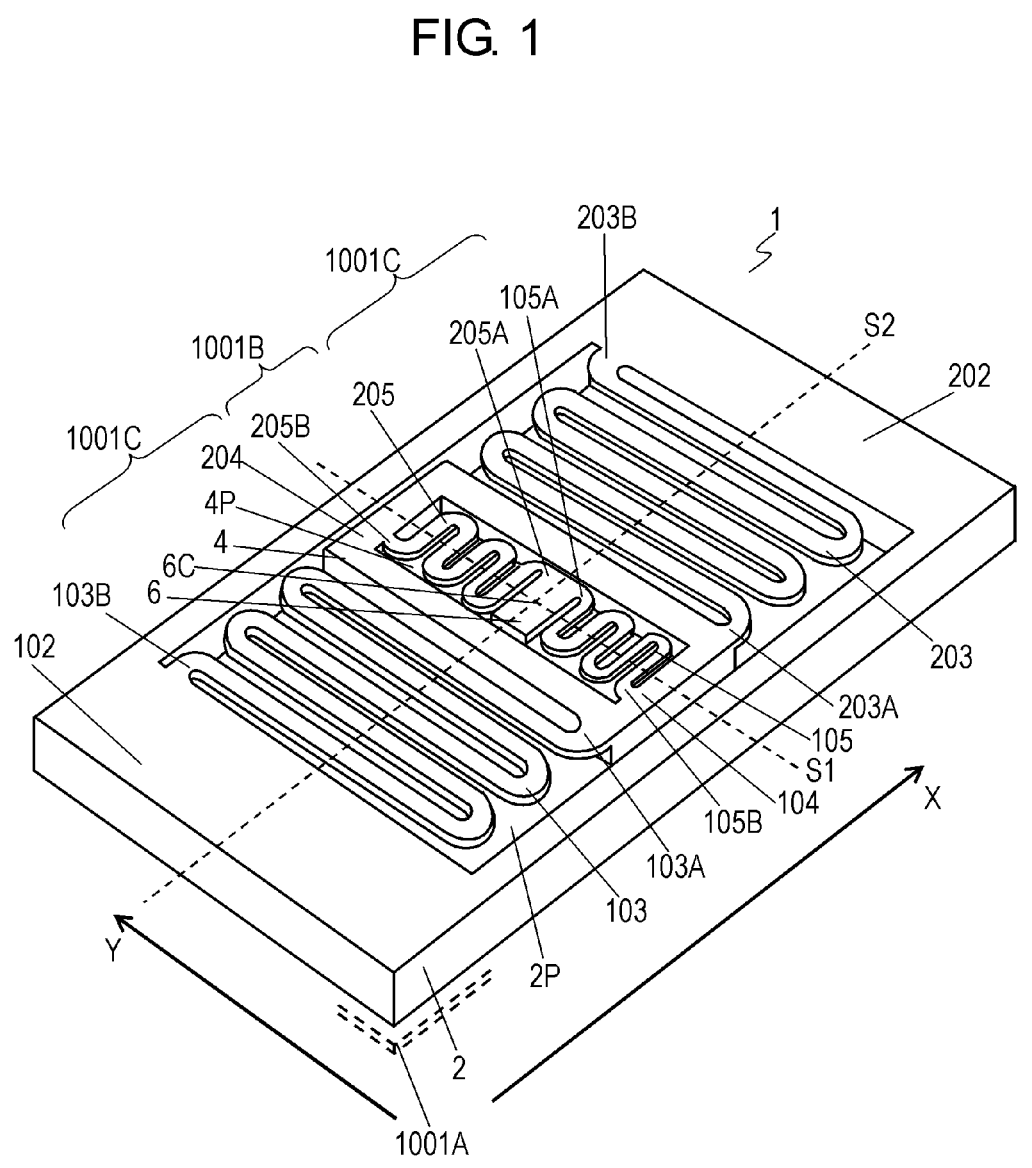
Figure 2:
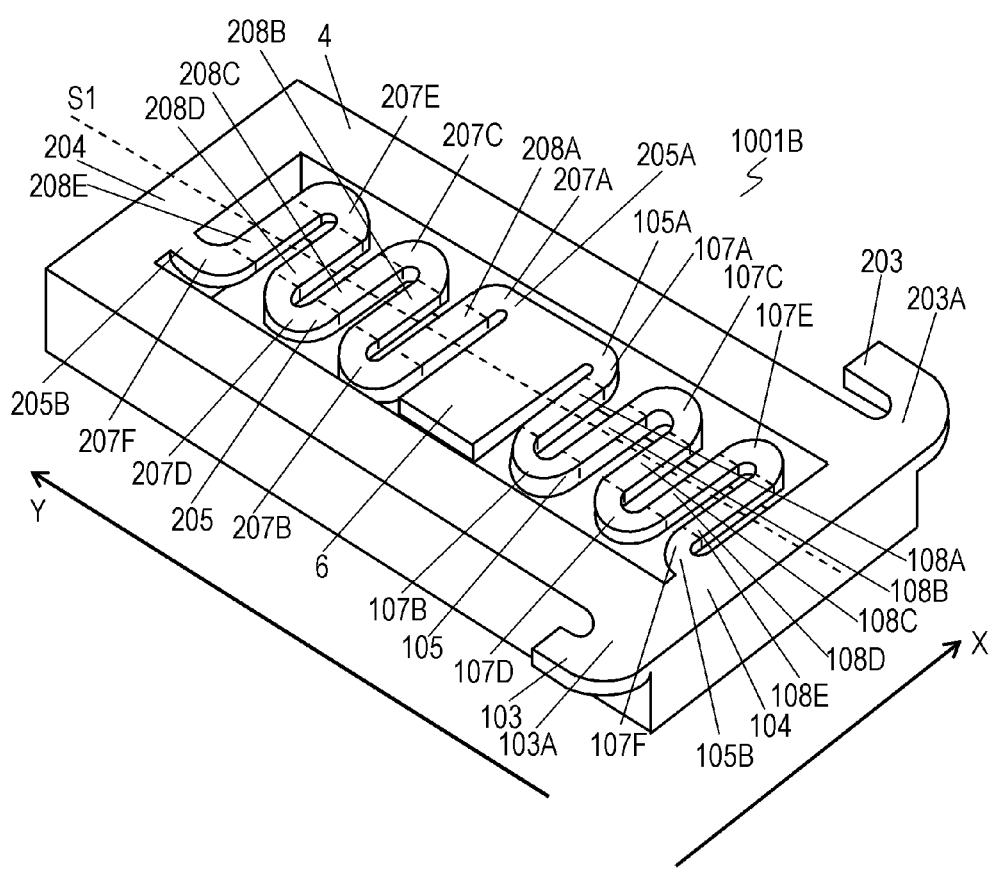
FIG. 2 is a perspective view of a high-frequency driving section of the optical reflection element shown in FIG. 1.

FIG. 1 is a perspective view of optical reflection element 1 according to Exemplary Embodiment 1 of the present invention. Optical reflection element 1 includes frame 2, meandrous vibrating parts 103 and 203 connected with frame 2, frame 4 supported by meandrous vibrating parts 103 and 203, meandrous vibrating parts 105 and 205 connected with frame 4, and mirror part 6 supported by meandrous vibrating parts 105 and 205. Frame 2 has a rectangular frame shape and includes portions 102 and 202 facing each other across central space 2P. Portions 102 and 202 constitute shorter sides of the rectangular frame shape. Frame 2 is configured to be fixed to mounting base 1001A. Meandrous vibrating parts 103 and 203 have outer ends 103B and 203B and inner ends 103A and 203A opposite to outer ends 103B and 203B, respectively. Outer ends 103B and 203B of meandrous vibrating parts 103 and 203 are connected with and supported by portions 102 and 202 of frame 2, respectively. Meandrous vibrating parts 103 and 203 extend along vibration axis S2 meanderingly from outer ends 103B and 203B to inner ends 103A and 103B, respectively. Frame 4 has a rectangular frame shape and includes portions 104 and 204 facing each other across central space 4P. Portions 104 and 204 constitute shorter sides of the rectangular frame shape. Frame 4 is connected with and supported by inner ends 103A and 203A of meandrous vibrating parts 103 and 203, and is a movable frame that can rotate back and forth about vibration axis S2. Meandrous vibrating parts 105 and 205 have outer ends 105B and 205B and inner ends 105A and 205A opposite to outer ends 105B and 205B, respectively. Outer ends 105B and 205B of meandrous vibrating parts 105 and 205 are connected with and supported by portions 104 and 204 of frame 4, respectively. Meandrous vibrating parts 105 and 205 extend along vibration axis S1 perpendicular to vibration axis S2 meanderingly from outer ends 105B and 205B to inner ends 105A and 105B, respectively. Mirror part 6 is connected with and supported by inner ends 105A and 205A of meandrous vibrating parts 105 and 205, and can rotate back and forth about vibration axis S1. Since frame 4 rotates back and forth about vibration axis S2, mirror part 6 rotates back and forth about vibration axes S1 and S2. Frame 4 and meandrous vibrating parts 103 and 203 constitute low-frequency driving section 1001C that vibrates at a low frequency. Mirror part 6 and meandrous vibrating parts 105 and 205 constitute high-frequency driving section 1001B that vibrates at a higher frequency than low-frequency driving section 1001C.

FIG. 2 is a perspective view of high-frequency driving section 1001B of optical reflection element 1 shown in FIG. 1. Meandrous vibrating part 105 includes curved portions 107A to 107F having a curved shape and vibrating beams 108A to 108E having a straight shape. Vibrating beams 108A to 108E are arranged alternately with curved portions 107A to 107F to couple curved portions 107A to 107F meanderingly. Curved portions 107A to 107F are arranged in this order along meandrous vibrating part 105 in a direction from inner end 105A toward outer end 105B while the curved portions are located at both sides of vibration axis S1. The curvatures of curved portions 107A to 107F are sequentially smaller as located away from inner end 105A to outer end 105B. According to Embodiment 1, the curvatures of curved portions 107A, 107B, 107C, 107D, 107E, and 107F are 0.0264 $\mu m^{-1}$, 0.0231 $\mu m^{-1}$, 0.0213 $\mu m^{-1}$, 0.0201 $\mu m^{-1}$, 0.0196 $\mu m^{-1}$, and 0.0196 $\mu m^{-1}$, respectively.

Similarly, meandrous vibrating part 205 includes curved portions 207A to 207F having a curved shape and vibrating beams 208A to 208E having a straight shape. Vibrating beams 208A to 208E are arranged alternately with curved portions 207A to 207F to couple curved portions 207A to 207F meanderingly. Curved portions 207A to 207F are arranged in this order along meandrous vibrating part 205 in a direction from inner end 205A toward outer end 205B while the curved portions are located at both sides of vibration axis S1. The curvatures of curved portions 207A to 207F are sequentially smaller as located away from inner end 205A to outer end 205B. According to Embodiment 1, the curvatures of curved portions 207A, 207B, 207C, 207D, 207E, and 207F are the same as curved portions 107A, 107B, 107C, 107D, 107E, and 107F, that is, 0.0264 $\mu m^{-1}$, 0.0231 $\mu m^{-1}$, 0.0213 $\mu m^{-1}$, 0.0201 $\mu m^{-1}$, 0.0196 $\mu m^{-1}$, and 0.0196 $\mu m^{-1}$, respectively.

The inner peripheries and the outer peripheries of curved portions 107A to 107F and 207A to 207F have a smoothly-curved shape, such as a circular arc shape or an elliptical arc shape.

Figure 3A:
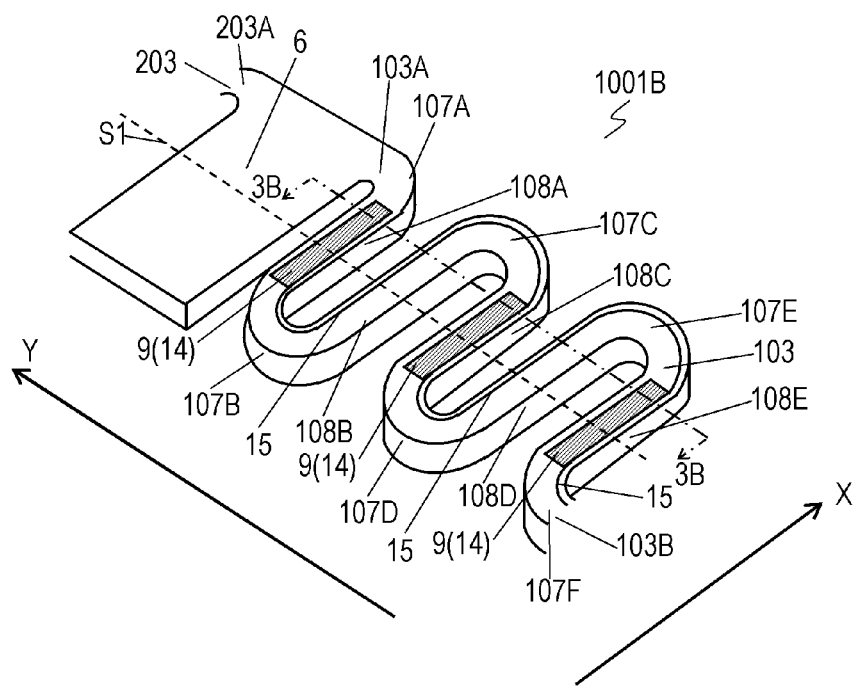
FIG. 3A is a perspective view of an essential portion of the high-frequency driving section shown in FIG. 2.

FIG. 3A is a perspective view of an essential portion of high-frequency driving section 1001B shown in FIG. 2. Vibrating beams 108A to 108E of meandrous vibrating part 105 are arranged along vibration axis S1. Piezoelectric actuators 9 are disposed on every other one of vibrating beams 108A to 108E, i.e. on vibrating beams 108A, 108C, and 108E. Wirings 15 are disposed on vibrating beams 108B and 108D on which piezoelectric actuator 9 is not disposed. Wirings 15 connect upper electrodes 14 of piezoelectric actuators 9 with each other while the actuators are disposed on vibrating beams 108A, 108C, and 108E. Similarly, vibrating beams 208A to 208E of meandrous vibrating part 205 are arranged along vibration axis S1. Piezoelectric actuators 9 are disposed on every other one of vibrating beams 208A to 208E, i.e. on vibrating beams 208A, 208C, and 208E. Wirings 15 are disposed on vibrating beams 208B and 208D on which piezoelectric actuator 9 is not disposed. Wirings 15 connect upper electrodes 14 of piezoelectric actuators 9 with each other while the actuators are disposed on vibrating beams 208A, 208C, and 208E. Upper electrodes 14 have widths larger than those of wirings 15.

Figure 3B:
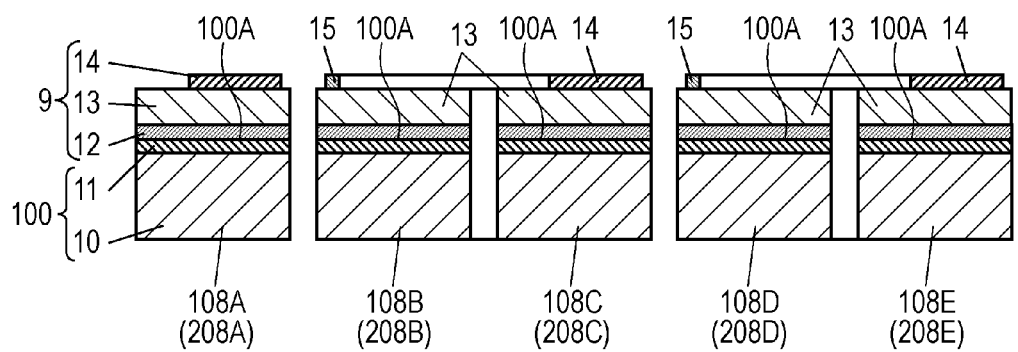
FIG. 3B is a cross-sectional view of the high-frequency driving section at line 3B-3B shown in FIG. 3A.

FIG. 3B is a cross-sectional view of high-frequency driving section 1001B at line 3B-3B shown in FIG. 3A. Each of meandrous vibrating parts 105 and 205 includes base 100, actuators 9 disposed on base 100, and wirings 15 connecting upper electrodes 14 of actuators 9 with each other. Base 100 includes silicon substrate 10 and silicon oxide film 11 disposed on silicon substrate 10. Lower electrode 12 is disposed on meandrous vibrating part 105 (205), i.e. on surface 100A of base 100. Piezoelectric body 13 is disposed on lower electrode 12. In vibrating beams 108A, 108C, 108E, 208A, 208C, and 208E, each of piezoelectric actuators 9 includes lower electrode 12, piezoelectric body 13, and upper electrode 14 disposed on piezoelectric body 13. In vibrating beams 108B, 108D, 208B, and 208D, wirings 15 are disposed on piezoelectric body 13. Silicon substrate 10 and silicon oxide film 11 constitute base 100 that has surface 100A with an insulation property. Upper electrodes 14 are formed on vibrating beams 108A, 108C, 108E, 208A, 208C, and 208E. Wirings 15 having smaller widths than upper electrodes 14 are formed on piezoelectric body 13 on vibrating beams 108B, 108D, 208B, and 208D which are adjacent to vibrating beams 108A, 108C, 108E, 208A, 208C, and 208E.

In meandrous vibrating parts 105 and 205 according to Embodiment 1, piezoelectric body 13 is formed above base 100, i.e., over curved portions 107A to 107F and 207A to 207F and vibrating beams 108A to 108E and 208A to 208E. However, piezoelectric body 13 may be disposed at least on vibrating beams 108A, 108C, 108E, 208A, 208C, and 208E, and may not necessarily be disposed on any of curved portions 107A to 107F and 207A to 207F. In this case, an insulating layer is disposed between lower electrode 12 and wirings 15 that couple upper electrodes 14 of actuators 9 with each other to prevent a short circuit between lower electrode 12 and wirings 15.

According to Embodiment 1, silicon substrate 10 and silicon oxide film 11 are used for base 100 of optical reflection element 1. In view of productivity, the base may preferably be made of an elastic material, such as a substrate of metal, glass, or ceramic, having mechanical strength and a high Young's modulus. For example, it is preferable to use a metal, rock crystal, glass, quartz, or ceramic material for the base, from view points of mechanical characteristics and availability. Moreover, other than silicon, use of a metal, such as titanium, stainless steel, elinvar, or brass alloy, provides optical reflection element 1 with excellent vibration characteristics and workability. In the case that base 100 has an insulation property, the surface of the base may not necessarily have an insulating film, such as silicon oxide film 11, thereon.

For a piezoelectric material for use in piezoelectric body 13, a material, such as lead zirconate titanate (PZT), having a high piezoelectric constant is preferably used. In this case, platinum may be used as lower electrode 12 to increase crystallinity of piezoelectric body 13. For upper electrodes 14, titanium/gold or the like may be used.

A method of manufacturing optical reflection element 1 according to Embodiment 1 will be described below.

First, for base 100, silicon substrate 10 with a thickness of approximately 0.5 mm is prepared. Silicon oxide film 11 is formed as an insulating film on silicon substrate 10. Then, lower electrode 12 is formed on silicon oxide film 11 by a thin-film processing technique, such as sputtering or vapor deposition. At this moment, the thickness of silicon substrate 10 may be changed. The change of the thickness can adjust a natural frequency of the base.

After that, piezoelectric body 13 is formed on lower electrode 12 by, e.g., sputtering. At this moment, an orientation control layer made of an oxide dielectric containing Pb and Ti may preferably be provided between piezoelectric body 13 and lower electrode 12. More preferably, an orientation control layer made of PLMT is formed between them. This configuration enhances a crystalline orientation of piezoelectric body 13, thereby providing piezoelectric actuators 9 with excellent piezoelectric characteristics.

Next, a titanium film is formed on piezoelectric body 13, and then, a gold film is formed on the titanium film to form a titanium/gold film constituting upper electrodes 14 and wirings 15.

In this case, the titanium film under the gold film enhances the gold film to adhere to piezoelectric body 13 such as a PZT thin film. Therefore, metals, such as chromium, may be used for this layer other than titanium. This configuration provides a diffusion layer adhering strongly to the gold film and piezoelectric body 13, thus providing piezoelectric actuators 9 with high adhesion strength.

According to Embodiment 1, the thickness of lower electrode 12 of platinum is 0.2 μm, the thickness of piezoelectric body 13 is 3.5 μm, the thickness of the titanium film for upper electrodes 14 is 0.01 μm, and the thickness of the gold film is 0.3 μm.

Next, the resulting product is etched and patterned to form lower electrode 12, piezoelectric body 13, upper electrodes 14, and wirings 15 by photolithographic techniques.

In this case, the etchant for forming upper electrodes 14 and wirings 15 contains a mixed solution of iodine and potassium iodide and a mixed solution of ammonium hydroxide and hydrogen peroxide, which form predetermined electrode patterns of upper electrodes 14 and wirings 15.

Moreover, the method of etching to form lower electrode 12 and piezoelectric body 13 may be any one of a dry etching method and a wet etching method, or alternatively a combined method of them may be used for it.

For the dry etching method, fluorocarbon-based etching gas or $SF_6$ gas can be used.

Alternatively, piezoelectric body 13 may be formed by wet etching and patterning using a mixed solution of hydrofluoric acid, nitric acid, acetic acid, and hydrogen peroxide, and then by dry etching for pattering of lower electrode 12.

Next, silicon substrate 10 may be isotropically dry-etched with $XeF_2$ gas to remove unnecessary portions thereof so as to pattern base 100, thereby forming optical reflection element 1 having the shape shown in FIG. 1.

In order to etch silicon substrate 10 accurately, a dry etching method utilizing anisotropy of silicon is preferably used. In this case, it is possible to carry out straight-line etching in a direction perpendicular to the surface by using mixed gas of $SF_6$ gas that accelerates the etching and $C_4F_8$ gas that suppresses the etching, or by using these gases alternately by switching.

This manufacturing method described above can manufacture small and precise optical reflection element 1 efficiently at once.

According to Embodiment 1, silicon substrate 10 (base 100) is processed to unitarily form the substrates constituting mirror part 6, meandrous vibrating parts 105 and 205, meandrous vibrating parts 103 and 203, frame 4, and frame 2. This method provides optical reflection element 1 having stable vibration characteristics at high productivity.

Mirror part 6 can be formed by mirror-polishing the surface of base 100, and alternatively, may be made of a metal film as a mirror film formed on the surface of base 100 as a mirror film while the film is made of metal, such as gold, silver, or aluminum, having high light reflection characteristics. According to Embodiment 1, the gold film is formed to serve as upper electrodes 14, and this gold film can be used as the mirror film, thereby increasing manufacturing efficiency of optical reflection element 1.

An operation of optical reflection element 1 according to Embodiment 1 will be described below.

First, lower electrode 12 of meandrous vibrating parts 105 and 205 shown in FIG. 3B is grounded. An alternating-current (AC) voltage with a frequency (30 kHz) equal to the resonance frequency of optical reflection element 1 is applied to upper electrodes 14.

Applying the AC voltage, the AC voltage is applied to piezoelectric body 13 between lower electrode 12 and upper electrodes 14 on vibrating beams 108A, 108C, 108E, 208A, 208C, and 208E on which upper electrodes 14 having a large width shown in FIG. 3A are disposed. This configuration displaces vibrating beams 108A to 108E and 208A to 208E such that these beams are convexly bent alternately in opposite directions to each other.

In this case, the AC voltage applied to upper electrodes 14 is also applied to wirings 15 disposed on vibrating beams 108B, 108D, 208B, and 208D adjacent to vibrating beams 108A, 108C, 108E, 208A, 208C, and 208E. However, since wirings 15 have smaller width than upper electrodes 14, the voltage is not substantially applied to piezoelectric body 13 disposed on vibrating beams 108B, 108D, 208B, and 208D. In accordance with a resonance principle, vibrating beams 108B, 108D, 208B, and 208D are displaced in the direction opposite by 180° to the direction in which adjacent vibrating beams 108A, 108C, 108E, 208A, 208C, and 208E are displaced.

According to Embodiment 1, in vibrating beams 108A to 108E and 208A to 208E, one upper electrode 14 can cause the vibrating beams adjacent to each other to be displaced in the direction opposite by 180 degrees to each other. Therefore, in meandrous vibrating parts 105 and 205, the displacement is increasingly accumulated about vibration axis S1 with increasing number of beams 108A to 108E and 208A to 208E starting from respective outer ends 105B and 205B. This results in a large displacement and rotating of inner ends 105A and 205A even with one upper electrode 14.

Moreover, according to Embodiment 1, since the AC voltage is applied to piezoelectric actuators 9 to cause the resonance, the bending direction of vibrating beams 108A, 108C, 108E, 208A, 208C, and 208E is reversed every half cycle of the vibration thereof, thereby doubling the amount of the displacement.

As shown in FIG. 2, mirror part 6 is connected with inner ends 105A and 205A of meandrous vibrating parts 105 and 205. This structure allows vibration energy of meandrous vibrating parts 105 and 205 to transmit to mirror part 6, causing mirror part 6 to rotate back and forth about vibration axis S1.

As shown in FIG. 1, vibration axis S2 of meandrous vibrating parts 103 and 203 that constitute low-frequency driving section 1001C crosses vibration axis S1 of meandrous vibrating parts 105 and 205 perpendicularly. Meandrous vibrating parts 103 and 203 have the structure and operation similar to those of meandrous vibrating parts 105 and 205. This allows frame 4 to rotate back and forth about vibration axis S2, thereby causing mirror part 6 to rotate back and forth about vibration axis S2 via frame 4. According to Embodiment 1, frame 4 and mirror part 6 rotate back and forth about vibration axis S2 in resonance at a frequency of 1 kHz.

Figure 4:
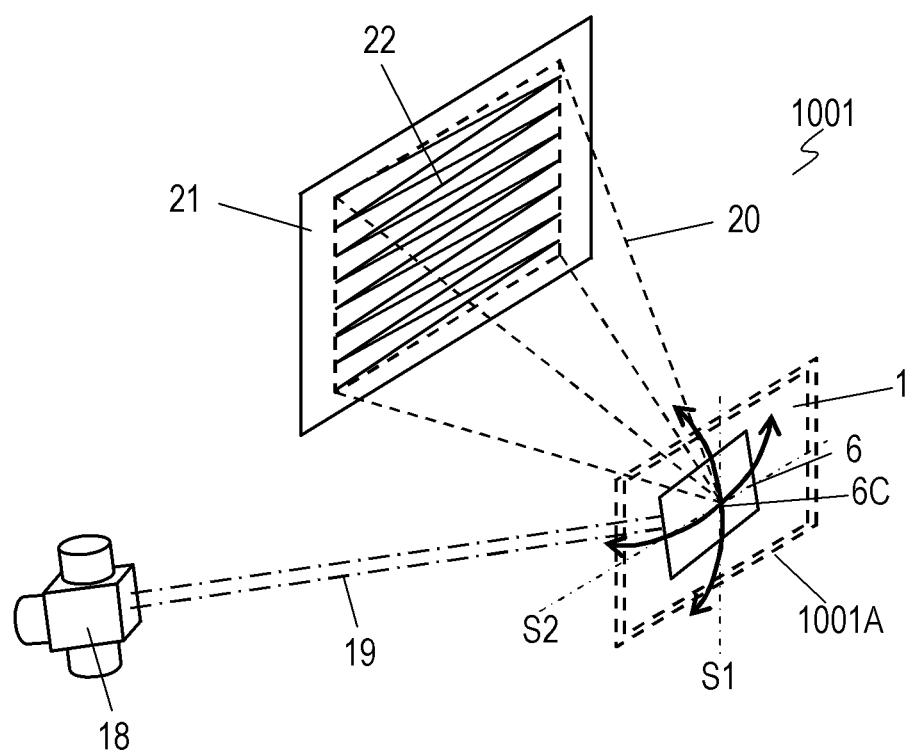
FIG. 4 is a perspective view of the optical reflection element according to Embodiment 1 for illustrating an operation of the optical reflection element.

FIG. 4 is a perspective view of optical reflection element 1 according to Embodiment 1 of the invention for illustrating an operation of optical reflection element 1, particularly showing projector 1001. Projector 1001 includes optical reflection element 1, light source 18 for emitting incident light 19 to mirror part 6 of optical reflection element 1, and mounting base 1001A for mounting and securing optical reflection element 1 thereto. Incident light 19 emitted from light source 18 to mirror part 6 is reflected by mirror part 6 to form reflected light 20, and reflected light 20 in turn reaches screen 21. The rotating back and forth of mirror part 6 about vibration axis S2 causes reflected light 20 to move back and forth in a vertical direction at low frequencies, while the rotating back and forth of mirror part 6 about vibration axis S1 causes reflected light 20 to move back and forth in a horizontal direction at a higher frequency than in the vertical direction. This operation allows reflected light 20 to scan in two axes. Reflected light 20 swung vertically and horizontally by mirror part 6 scans screen 21 so as to display image 22 on screen 21. The lower frequency at which reflected light 20 is swung in the vertical direction increases a resolution of image 22.

At point 6C (see FIG. 1) on mirror part 6, vibration axis S1 about which meandrous vibrating parts 105 and 205 vibrate crosses vibration axis S2 about which meandrous vibrating parts 103 and 203 vibrate. Therefore, point 6C on mirror part 6 is a fixed-point which is not displaced with respect to any of light source 18, mounting base 1001A, and screen 21. By emitting incident light 19 to point 6C, optical path lengths of incident light 19 and reflected light 20 can be constant, hence projecting high-resolution image 22.

Optical reflection element 1 allows mirror part 6 to rotate back and forth by large angles. Therefore, if the distance from optical reflection element 1 to screen 21 is constant, the area of high-resolution image 22 can be expanded. If the area of image 22 is constant, the distance from optical reflection element 1 to screen 21 can be smaller. Optical reflection element 1 installed in projector 1001, e.g. a head-up display or a head-mounted display projects images on a large screen while reducing the size of the electronic device.

In a projector including the structure of high-frequency driving section 1001B but not including low-frequency driving section 1001C, mirror part 6 rotates back and forth about single vibration axis S1, performing one-axis scanning of the reflected light. This can be utilized in, e.g. a laser printer.

Figure 6:
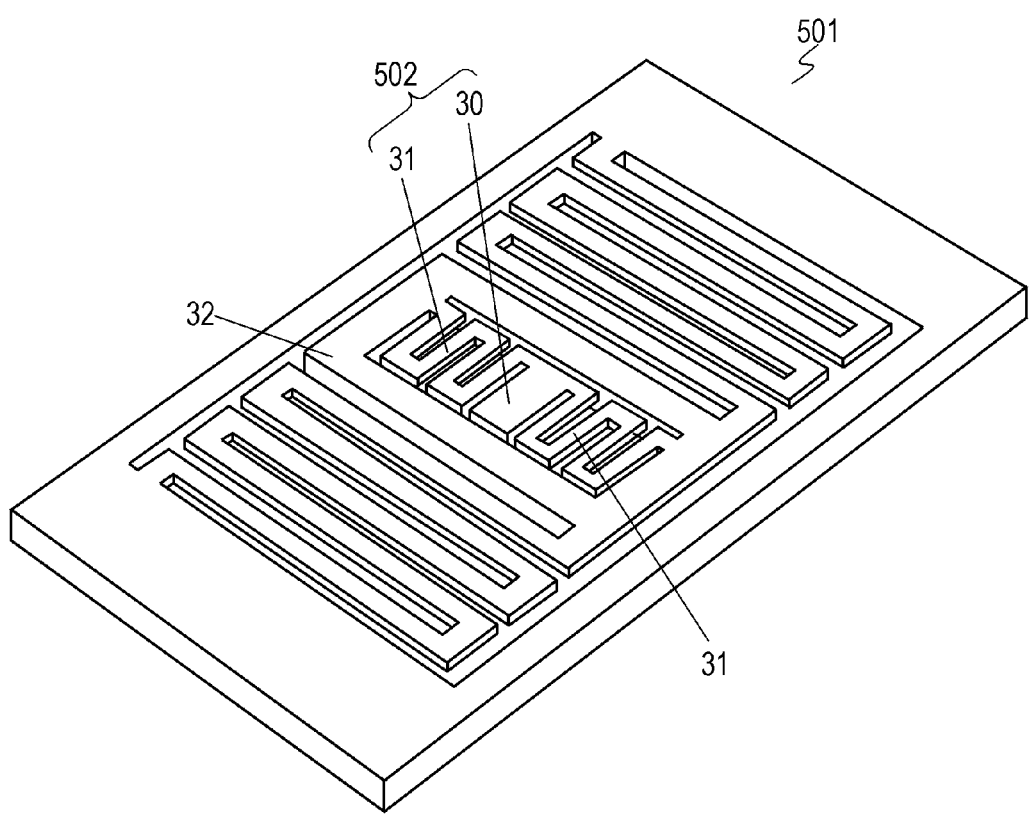
FIG. 6 is a perspective view of a conventional optical reflection element.

In conventional optical reflection element 501 shown in FIG. 6, curved portions of meandrous vibrating parts 31 may break when mirror part 30 rotates back and forth largely. That is, an imbalance in displacement stresses on the curved portions of meandrous vibrating parts 31 is produced, thereby causing degradation of the curved portions by repetitive vibration thereof. The degradation starts with a curved portion which produces the largest displacement stress, and breaks the curved portion. For this reason, conventional optical reflection element 501 including meandrous vibrating parts 31 hardly increases the deflection angle of mirror part 30 to a desired level.

In optical reflection element 1 according to Embodiment 1, curved portions 107A to 107F have curvatures thereof becoming sequentially smaller as located away from inner end 105A to outer end 105B, while the curved portions are located at both sides of vibration axis S1 of meandrous vibrating parts 105 and 205. Curved portions 207A to 207F have curvatures thereof becoming sequentially smaller as located away from inner end 205A to outer end 205B, while the curved portions are located at both sides of vibration axis S1 of meandrous vibrating parts 105 and 205. This configuration prevents curved portions 107A to 107F and 207A to 207F from breaking.

Specifically, curved portions 107A to 107F have curvatures thereof becoming sequentially smaller as located away from inner end 105A to outer end 105B while curved portions 207A to 207F have curvatures thereof becoming sequentially smaller as located away from inner end 205A to outer end 205B. This configuration reduces an imbalance of displacement stresses on curved portions 107A to 107F and 207A to 207F of high-frequency driving section 1001B of meandrous vibrating parts 105 and 205, and allows these stresses to be evenly dispersed, thereby reducing the displacement stresses from a breaking limit. The smaller the curvatures of curved portions 107A to 107F and 207A to 207F are, the smaller the displacement stresses on the portions are. In meandrous vibrating parts 105 and 205, since outer ends 105B and 205B are less movable than inner ends 105A and 205A, the outer ends tend to receive larger displacement stresses when the meandrous vibrating parts rotate back and forth about vibration axis S1. Accordingly, the curvatures of the curved portions which are closer to outer ends 105B and 205B receiving larger displacement stresses are smaller than those of the curved portions located closer to inner ends 105A and 205A, thereby reducing the imbalance of the displacement stresses.

This configuration can increase the deflection angle of mirror part 6 even if increasing the driving frequency of high-frequency driving section 1001B.

In optical reflection element 1 according to Embodiment 1, even when utilizing resonance driving, it is possible to increase the critical deflection angle of mirror part 6 without decreasing the resonance frequency. That is, it is possible to solve a trade-off that an increase of the driving frequency leads to a decrease of the deflection angle whereas an increase of the deflection angle leads to a decrease of the resonance frequency.

For example, the deflection angle can be increased by increasing the lengths of meandrous vibrating parts 105 and 205; however, this causes a decrease in the resonance frequency as well as an increase of the size of optical reflection element 1. Alternatively, the deflection angle of mirror part 6 can also be increased by evenly decreasing the curvatures of curved portions 107A to 107F and 207A to 207F or by evenly decreasing the widths of curved portions 107A to 107F and 207A to 207F; however, this causes a decrease of the resonance frequency.

Optical reflection element 1 according to Embodiment 1 can increase the critical deflection angle of mirror part 6 without changing the size and the resonance frequency by determining the curvatures of curved portions 107A to 107F and 207A to 207F as described above.

Specifically, according to Embodiment 1, the inner peripheral curvatures of curved portions 107A and 207A are 0.0264 $\mu m^{-1}$, the inner peripheral curvatures of curved portions 107B and 207B are 0.0231 $\mu m^{-1}$, the inner peripheral curvatures of curved portions 107C and 207C are 0.0213 $\mu m^{-1}$, the inner peripheral curvatures of curved portions 107D and 207D are 0.0201 $\mu m^{-1}$, the curvatures of curved portions 107E and 207E are 0.0196 $\mu m^{-1}$, and the curvatures of curved portions 107F and 207F are 0.0196 $\mu m^{-1}$. Thus, the curvatures of the curved portions as their locations become closer to outer ends 105B and 205B along meandrous vibrating parts 105 and 205 are sequentially gradually reduced, respectively. This structure provides a large critical deflection angle (±12.6°) of mirror part 6 without changing the size of the element and the resonance frequency (30 kHz).

For example, a comparative example of an optical reflection element in which the inner peripheral curvatures of curved portions are uniformly 0.01428 $\mu m^{-1}$ has the critical deflection angle of ±9.5° of a mirror part. Optical reflection element 1 according to Embodiment 1 can increase the critical deflection angle of mirror part 6 by approximately 30% compared with that of the comparative example without changing from the comparative example in the size of the element and the resonance frequency (30 kHz). This configuration provides a higher resolution and a wider area of image 22, and provides electronic device with a small size an improved performance.

According to Embodiment 1, meandrous vibrating parts 103 and 203 are driven to rotate back and forth and vibrate at 1 kHz, and meandrous vibrating parts 105 and 205 are driven to rotate back and forth and vibrate at 30 kHz. These driving frequencies are not limited to those described above. That is, meandrous vibrating parts 103 and 203 are driven to rotate back and forth and vibrate at a lower frequency while meandrous vibrating parts 105 and 205 are driven to rotate back and forth and vibrate at a higher frequency than meandrous vibrating parts 103 and 203.

As described above, frame 4 includes two portions 104 and 204 facing each other. Meandrous vibrating part 103 has, in the inside of frame 4, outer end 105B connected with one of portions 104 and 204 of frame 4, and has inner end 105A opposite to outer end 105B. Meandrous vibrating part 205 has, in the inside of frame 4, outer end 205B connected with another of two portions 104 and 204 of frame 4, and has inner end 205A opposite to outer end 205B. Mirror part 6 is supported by inner ends 105A and 205A of meandrous vibrating parts 105 and 205. Meandrous vibrating part 105 has a meandrous shape that includes plural curved portions 107A to 107F and plural vibrating beams 108A to 108E connected alternately with the curved portions 107A to 107F between outer end 105B and inner end 105A. Meandrous vibrating part 205 has a meandrous shape that includes plural curved portions 207A to 207F and plural vibrating beams 208A to 208E connected alternately with curved portions 207A to 207F between outer end 205B and inner end 205A. The curvature of respective one of the plural curved portions 107A to 107F is smaller than the curvature of at least one curved portion which is located closer to inner end 105A than the respective one of the plural curved portions 107A to 107F. The curvature of respective one of the plural curved portions 107A to 107F may not be larger than the curvatures of all of one or more curved portions which are located closer to inner end 105A than the respective one of the plural curved portions 107A to 107F. The curvature of respective one of the plural curved portions 207A to 207F is smaller than the curvature of any one of the curved portions which are located closer to inner end 205A than the respective one of the plural curved portions 207A to 207F. Particularly, a curvature of an inner periphery of respective one of the plural curved portions 107A to 107F is smaller than that of any one of the curved portions which are located closer to inner end 105A than the respective one of the plural curved portions 107A to 107F. Particularly, the curvature of an inner periphery of respective one of the plural curved portions 207A to 207F is smaller than that of at least one curved portion which is located closer to inner end 205A than the respective one of the plural curved portions 207A to 207F. A curvature of an inner periphery of respective one of the plural curved portions 207A to 207F may be not larger than that of all of one or more curved portions which are located closer to inner end 205A than the respective one of the plural curved portions 207A to 207F.

Piezoelectric actuator 9 to vibrate meandrous vibrating part 105 includes lower electrode 12 disposed on base 100 constituting meandrous vibrating part 105, piezoelectric body 13 disposed on lower electrode 12, and at least one upper electrode 14 disposed on piezoelectric body 13. Lower electrode 12 is disposed on base 100 over the plural vibrating beams 108A to 108E and the plural curved portions 107A to 107E. Piezoelectric body 13 is disposed on lower electrode 12 over the plural vibrating beams 108A to 108E and the plural curved portions 107A to 107F. Upper electrode 14 is disposed on piezoelectric body 13 over at least one of the plural vibrating beams 108A to 108E. Piezoelectric actuator 9 to vibrate meandrous vibrating part 205 includes lower electrode 12 disposed on base 100 constituting meandrous vibrating part 205, piezoelectric body 13 disposed on lower electrode 12, and at least one upper electrode 14 disposed on piezoelectric body 13. Lower electrode 12 is disposed on base 100 over the plural vibrating beams 208A to 208E and the plural curved portions 207A to 207F. Piezoelectric body 13 is disposed on lower electrode 12 over the plural vibrating beams 208A to 208E and the plural curved portions 207A to 207F. Upper electrode 14 is disposed on piezoelectric body 13 over at least one of the plural vibrating beams 208A to 208E.

Meandrous vibrating part 105 vibrates to rotate back and forth about vibration axis S1. The plural curved portions 107A to 107F are located at both sides of vibration axis S1. A curvature of respective one of the plural curved portions 107A to 107F is smaller than that of any one of the curved portions which are located closer, along meandrous vibrating part 105, to inner end 105A than the respective one of the plurality of curved portions 107A to 107F. Particularly, the inner peripheral curvature of respective one of the plurality of curved portions 107A to 107F is smaller than that of any one of the curved portions which are located closer, along meandrous vibrating part 105, to inner end 105A than the respective one of the plural curved portions 107A to 107F. Meandrous vibrating part 205 vibrates to rotate back and forth about vibration axis S1. The plural curved portions 207A to 207F are located at both sides of vibration axis S1. The curvature of respective one of the plural curved portions 207A to 207F is smaller than that of any one of the curved portions which are located closer, along meandrous vibrating part 205, to inner end 205A than the respective one of the plural curved portions 207A to 207F. Particularly, the curvature of an inner periphery of respective one of the plural curved portions 207A to 207F is smaller than that of any one of the curved portions which are located closer, along meandrous vibrating part 205, to inner end 205A than the respective one of the plural curved portions 207A to 207F. In the plural curved portions 107A to 107F of meandrous vibrating part 105, the curvatures (particularly of the inner peripheries) of the curved portions which are located closer, along meandrous vibrating part 105, to outer end 105B are smaller. Moreover, in the plural curved portions 207A to 207F of meandrous vibrating part 205, the curvatures (particularly of the inner peripheries) of the curved portions located closer, along meandrous vibrating part 205, to outer end 205B are smaller.

The plural vibrating beams 108A to 108E of meandrous vibrating part 105 are arranged along vibration axis S1. The plural vibrating beams 208A to 208E of meandrous vibrating part 205 are arranged along vibration axis S1. Plural upper electrodes 14 are disposed on piezoelectric body 13 over every other one of the plural vibrating beams 108A to 108E, i.e., over vibrating beams 108A, 108C, and 108E. Similarly, plural upper electrodes 14 are disposed on piezoelectric body 13 over every other one of the plural arranged vibrating beams 208A to 208E, i.e., over vibrating beams 208A, 208C, and 208E.

Wirings 15 are disposed on piezoelectric body 13 over vibrating beams 108B and 108D out of the plural vibrating beams 108A to 108E over which the plural upper electrodes 14 are not disposed, and connect upper electrodes 14 with each other. Wirings 15 are disposed on piezoelectric body 13 over vibrating beams 208B and 208D out of the plural vibrating beams 208A to 208E over which upper electrodes 14 are not disposed, and connect upper electrodes 14 with each other.

Frame 2 includes two portions 102 and 202 facing each other. Meandrous vibrating part 103 has outer end 103B and inner end 103A opposite to outer end 103B. Outer end 103B is connected with one of two portions 102 and 202 of frame 2. Inner end 103A supports frame 4. Meandrous vibrating part 203 has outer end 203B and inner end 203A opposite to outer end 203B. Outer end 203B is connected with another of two portions 102 and 202 of frame 2. Inner end 203A supports frame 4. According to Embodiment, the description has been made focusing on high-frequency driving section 1001B. In meandrous vibrating parts 103 and 203 constituting low-frequency driving section 1001C, the same structures as those of meandrous vibrating parts 105 and 205 may be applied to the curvatures of the curved portions thereof, thereby providing the same effects. Since outer ends 103B and 203B of meandrous vibrating parts 103 and 203 are configured to be fixed to mounting base 1001A, outer ends 103B and 203B are less movable than inner ends 103A and 203A and receive more larger stresses upon vibrating. The inner peripheries and the outer peripheries of the plural curved portions of meandrous vibrating parts 103 and 203 have a smoothly-curved shape, such as a circular arc shape or an elliptical arc shape. In meandrous vibrating part 103, the curvatures (particularly of the inner peripheries) of the curved portions which are located closer, along meandrous vibrating part 103, to outer end 103B are smaller. Moreover, in meandrous vibrating part 203, the curvatures (particularly of the inner peripheries) of the curved portions which are located closer, along meandrous vibrating part 203, to outer end 203B are smaller. That is, the curvature (particularly of the inner periphery) of respective one of the plural curved portions of meandrous vibrating part 103 is smaller than the curvature (particularly of the inner periphery) of any one of the curved portions which are located closer to inner end 103A than the respective one of the plural curved portions. Moreover, the curvature (particularly of the inner periphery) of respective one of the plural curved portions of meandrous vibrating part 203 is smaller than the curvature (particularly of the inner periphery) of any one of the curved portions which are located closer to inner end 203A than the respective one of the plural curved portions. This configuration caused the stresses on the respective curved portions to be equal to each other, thereby allowing mirror part 6 to rotate back and forth about vibration axis S2 by larger angles.

According to Embodiment 1, the number of the vibrating beams is five in each of meandrous vibrating parts 103 and 203 and meandrous vibrating parts 105 and 205. The number may be smaller or larger than five, providing the same effects. Positions at which frames 2 and 4 are connected with meandrous vibrating parts 103 and 203 and meandrous vibrating parts 105 and 205 may be either on vibration axes S1 and S2 or at other places, providing the same effects.

Exemplary Embodiment 2

Figure 5A:
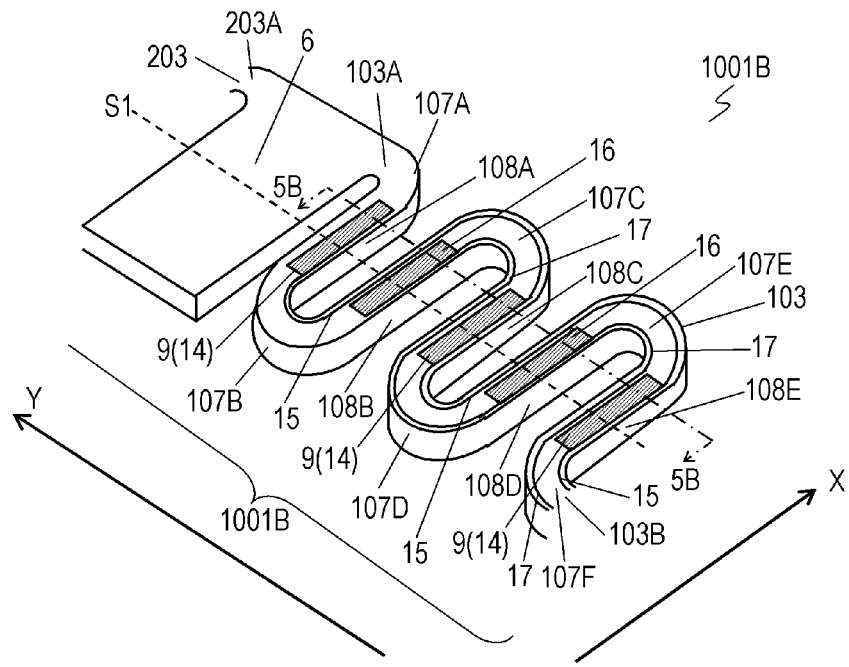
FIG. 5A is a perspective view of an essential portion of a high-frequency driving section of an optical reflection element according to Exemplary Embodiment 2 of the invention.
Figure 5B:
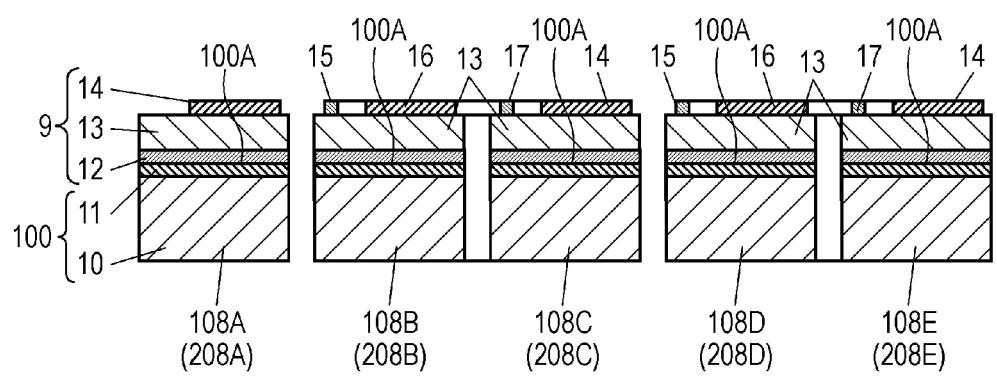
FIG. 5B is a cross-sectional view of the high-frequency driving section at line 5B-5B shown in FIG. 5A.

FIG. 5A is a perspective view of an essential portion of high-frequency driving section 1001B of optical reflection element 1 according to Exemplary Embodiment 2 of the present invention. FIG. 5B is a cross-sectional view of high-frequency driving section 1001B at line 5B-5B shown in FIG. 5A. In FIGS. 5A and 5B, components identical to those of high-frequency driving section 1001B according to Embodiment 1 shown in FIGS. 3A and 3B are denoted by the same reference numerals. In high-frequency driving section 1001B according to Embodiment 2 shown in FIGS. 5A and 5B, upper electrodes 14 and monitor electrodes 16 are alternately disposed on piezoelectric body 13 of meandrous vibrating parts 105 and 205.

Specifically, monitor electrodes 16 are provided on piezoelectric body 13 as shown in FIG. 5B, similarly to upper electrodes 14. Upper electrodes 14 are disposed on piezoelectric body 13 over every other one of vibrating beams 108A to 108E, i.e., over vibrating beams 108A, 108C, and 108E. In vibrating beams 108B and 108D, monitor electrodes 16 are disposed on piezoelectric body 13 together with wirings 15. In vibrating beams 108C and 108E, wirings 17 connecting monitor electrodes 16 with each other are disposed on piezoelectric body 13 together with upper electrodes 14.

Similarly, monitor electrodes 16 are provided on piezoelectric body 13 similarly to upper electrodes 14. Upper electrodes 14 are disposed on piezoelectric body 13 over every other one of vibrating beams 208A to 208E, i.e., over vibrating beams 208A, 208C, and 208E. In vibrating beams 208B and 208D, monitor electrodes 16 are disposed on piezoelectric body 13 together with wirings 15. In vibrating beams 208C and 208E, wirings 17 connecting monitor electrodes 16 with each other are disposed on piezoelectric body 13 together with upper electrodes 14. Monitor electrodes 16 are larger in width than wirings 15 and 17. Upper electrodes 14 have larger widths than wirings 15 and 17.

Monitor electrodes 16 can detect deformation of piezoelectric body 13 as electric signals, and output the signals in response to the vibrations of meandrous vibrating parts 105 and 205. Since upper electrodes 14 and monitor electrodes 16 are alternately disposed in vibrating beams 108A to 108E and 208A to 208E, the signals output from monitor electrodes 16 has phases opposite to an alternating-current (AC) voltage applied to upper electrodes 14. The signals are input to upper electrodes 14 via a feedback circuit, thereby causing meandrous vibrating parts 105 and 205 to be self-driven accurately.

According to Embodiment 2, similarly to optical reflection element 1 according to Embodiment 1 shown in FIG. 1, piezoelectric actuators 9 are disposed over every other one of vibrating beams 108A to 108E and 208A to 208E. Accordingly, the number of electrodes connected with wirings 15 and 17 that are routed in meandrous vibrating parts 105 and 205 can sufficiently be two in total of monitor electrodes 16 and upper electrodes 14. This structure can thus prevent the number of the electrodes from increasing, hence improving productivity of optical reflection element 1 having a small size.

As described above, plural of wirings 15 connecting plural upper electrodes 14 with each other are disposed on piezoelectric body 13 over plural vibrating beams 108B and 108D out of vibrating beams 108A to 108E over which the upper electrodes 14 are not disposed. Plural monitor electrodes 16 output signals in response to the vibration of meandrous vibrating part 105. Monitor electrodes 16 are disposed on piezoelectric body 13, together with wiring 15, over each of vibrating beams 108B and 108D over which wirings 15 are disposed. Wirings 15 connecting upper electrodes 14 with each other are disposed on piezoelectric body 13 over vibrating beams 208B and 208D out of vibrating beams 208A to 208E over which upper electrodes 14 are not disposed. Monitor electrodes 16 output signals in response to the vibration of meandrous vibrating part 205. Monitor electrodes 16 are disposed on piezoelectric body 13 together with wiring 15 over vibrating beams 208B and 208D out of vibrating beams 208A to 208E over wirings 15 are disposed. Wirings 17 connecting monitor electrodes 16 with each other are disposed on piezoelectric body 13 over vibrating beam 108C (108E) out of the vibrating beams 108A to 108E over which at least one of the upper electrodes 14 is disposed. Wirings 17 connecting the monitor electrodes 16 with each other are disposed on piezoelectric body 13 over vibrating beam 208C (208E) out of vibrating beams 208A to 208E over which at least one of upper electrodes 14 is disposed.

The same configuration as piezoelectric actuators 9, monitor electrodes 16, and wirings 15 and 17 may be applied to meandrous vibrating parts 103 and 203 constituting low-frequency driving section 1001C, providing the same effects as those of high-frequency driving section 1001B.

INDUSTRIAL APPLICABILITY

An optical reflection element according to the present invention increases a deflection angle of a mirror part and improving resolution, and is applicable to an image projector, such as a head-up display, a head-mounted display device, and a laser printer.

REFERENCE MARKS IN THE DRAWINGS

2 Frame (Second Frame)
4 Frame (First Frame)
6 Mirror Part
9 Piezoelectric Actuator (First Piezoelectric Actuator, Second Piezoelectric Actuator)
12 Lower Electrode (First Lower Electrode, Second Lower Electrode)
13 Piezoelectric Body (First Piezoelectric Body, Second Piezoelectric Body)
14 Upper Electrode (First Upper Electrode, Second Upper Electrode)
15 Wiring (First Wiring, Second Wiring)
17 Wiring (Third Wiring, Fourth Wiring)
16 Monitor Electrode
103 Meandrous Vibrating Part (Third Meandrous Vibrating Part)
105 Meandrous Vibrating Part (First Meandrous Vibrating Part)
107A-107F Curved Portion (First Curved Portion)
108A-108E Vibrating Beam (First Vibrating Beam)
203 Meandrous Vibrating Part (Fourth Meandrous Vibrating Part)
205 Meandrous Vibrating Part (Second Meandrous Vibrating Part)
207A-207F Curved Portion (Second Curved Portion)
208a-208e Vibrating Beam (Second Vibrating Beam)
S1 Vibration Axis (First Vibration Axis)
S2 Vibration Axis (Second Vibration Axis)

The invention claimed is:

1. An optical reflection element comprising:
a first frame including two portions facing each other;
a first meandrous vibrating part having a first outer end and a first inner end opposite to the first outer end, the first outer end being connected with one of the two portions of the first frame in an inside of the first frame;
a second meandrous vibrating part having a second outer end and a second inner end opposite to the second outer end, the second outer end being connected with another of the two portions of the first frame and the inside of the first frame; and
a mirror part supported by the first inner end of the first meandrous vibrating part and the second inner end of the second meandrous vibrating part,
wherein the first meandrous vibrating part has a meandrous shape that includes a plurality of first curved portions and a plurality of first vibrating beams alternately connected with the plurality of first curved portions between the first outer end and the first inner end,
wherein the second meandrous vibrating part has a meandrous shape that includes a plurality of second curved portions and a plurality of second vibrating beams alternately connected with the plurality of second curved portions between the second outer end and the second inner end,
wherein a curvature of a respective one of the plurality of first curved portions is smaller than a curvature of at least one of the plurality of first curved portions which is located closer to the first inner end than the respective one of the plurality of first curved portions, and
wherein a curvature of a respective one of the plurality of second curved portions is smaller than a curvature of at least one of the plurality of second curved portions which is located closer to the second inner end than the respective one of the plurality of second curved portions.

2. The optical reflection element according to claim 1, further comprising:
a first piezoelectric actuator vibrating the first meandrous vibrating part, the first piezoelectric actuator including
a first lower electrode disposed on the first meandrous vibrating part over the plurality of first vibrating beams,
a first piezoelectric body disposed on the first lower electrode over the plurality of first vibrating beams, and
at least one first upper electrode disposed on the first piezoelectric body over at least one of the plurality of first vibrating beams; and
a second piezoelectric actuator vibrating the second meandrous vibrating part, the second piezoelectric actuator including
a second lower electrode disposed on the second meandrous vibrating part over the plurality of second vibrating beams,
a second piezoelectric body disposed on the second lower electrode over the plurality of second vibrating beams, and
at least one second upper electrode disposed on the second piezoelectric body over at least one of the plurality of second vibrating beams.

3. The optical reflection element according to claim 2,
wherein the first meandrous vibrating part vibrates to rotate back and forth about a first vibration axis,
wherein the plurality of first curved portions are located at both sides of the first vibration axis,
wherein a curvature of a respective one of the plurality of first curved portions is smaller than a curvature of at least one of the plurality of first curved portions which is located closer, along the first meandrous vibrating part, to the first inner end than the respective one of the plurality of first curved portions,
wherein the second meandrous vibrating part vibrates to rotate back and forth about the first vibration axis,
wherein the plurality of second curved portions are located at both sides of the first vibration axis, and
wherein a curvature of a respective one of the plurality of second curved portions is smaller than a curvature of at least one of the plurality of second curved portions which is located closer, along the second meandrous vibrating part, to the second inner end than the respective one of the plurality of second curved portions.

4. The optical reflection element according to claim 2,
wherein the plurality of first vibrating beams of the first meandrous vibrating part are arranged along the first vibration axis,
wherein the at least one first upper electrode comprises a plurality of first upper electrodes disposed on the first piezoelectric body over every other one of the plurality of arranged first vibrating beams, wherein the plurality of second vibrating beams of the second meandrous vibrating part are arranged along the first vibration axis, and wherein the at least one second upper electrode comprises a plurality of second upper electrodes disposed on the second piezoelectric body over every other one of the plurality of arranged second vibrating beams.

5. The optical reflection element according to claim 4, further comprising:
   a first wiring disposed on the first piezoelectric body over a first vibrating beam of the first vibrating beams over which the plurality of first upper electrodes are not disposed, the first wiring connecting the plurality of first upper electrodes with each other; and
   a second wiring disposed on the second piezoelectric body over a second vibrating beam of the second vibrating beams over which the plurality of second upper electrodes are not disposed, the second wiring connecting the plurality of second upper electrodes with each other.

6. The optical reflection element according to claim 4, further comprising:
   a plurality of first wirings disposed on the first piezoelectric body over a plurality of certain first vibrating beams out of the plurality of first vibrating beams over which the plurality of first upper electrodes are not disposed, the plurality of first wirings connecting the plurality of first upper electrodes with each other;
   a plurality of first monitor electrodes disposed on the first piezoelectric body together with the plurality of first wirings over the plurality of certain first vibrating beams, the plurality of first monitor electrodes outputting a signal in response to a vibration of the first meandrous vibrating part;
   a plurality of second wirings disposed on the second piezoelectric body over a plurality of certain second vibrating beams out of the plurality of second vibrating beams over which the plurality of second upper electrodes are not disposed, the plurality of second wirings connecting the plurality of second upper electrodes with each other;
   a plurality of second monitor electrodes disposed on the second piezoelectric body together with the plurality of second wirings over the plurality of certain second vibrating beams, the plurality of second monitor electrodes outputting a signal in response to a vibration of the second meandrous vibrating part;
   a third wiring disposed on the first piezoelectric body over a first vibrating beam out of the plurality of first vibrating beams over which at least one of the plurality of first upper electrodes is disposed, the third wiring connecting the plurality of first monitor electrodes with each other; and
   a fourth wiring disposed on the second piezoelectric body over a second vibrating beam out of the plurality of second vibrating beams over which at least one of the plurality of second upper electrodes is disposed, the fourth wiring connecting the plurality of second monitor electrodes with each other.

7. The optical reflection element according to claim 1, further comprising:
   a second frame including two portions facing each other;
   a third meandrous vibrating part having a third outer end and a third inner end opposite to the third outer end, the third outer end being connected with one of the two portions of the second frame, the third inner end supporting the first frame; and
   a fourth meandrous vibrating part having a fourth outer end and a fourth inner end opposite to the fourth outer end, the fourth outer end being connected with another of the two portions of the second frame, the fourth inner end supporting the first frame.

8. The optical reflection element according to claim 1, wherein the curvature of the respective one of the plurality of first curved portions is not larger than curvatures of any one of one or more first curved portions which are located closer to the first inner end than the respective one of the plurality of first curved portions.

9. The optical reflection element according to claim 8, wherein the curvature of the respective one of the plurality of second curved portions is not larger than curvatures of any one of one or more second curved portions which are located closer to the second inner end than the respective one of the plurality of second curved portions.

10. An optical reflection element comprising:
    a frame;
    a mirror part disposed in the frame;
    a first meandrous vibrating member connected to a first interior portion of the frame and a first portion of the mirror part; and
    a second meandrous vibrating member connected to a second interior portion of the frame and a second portion of the mirror part,
    wherein each of the first and second meandrous members includes a plurality of curved portions and a plurality of vibrating beams, each of the plurality of vibrating beams disposed between two of the plurality of curved portions,
    wherein each of more than one of the plurality of curved portions has a different curvature value.

11. The optical reflection element of claim 10, wherein the different curvature values of the more than one of the plurality of curved portions increases as a position of the curved portion approaches the mirror part.

12. A projector comprising:
    the optical reflection element of claim 10,
    a light source for emitting incident light to mirror part of optical reflection element; and
    a mounting base for mounting and securing optical reflection element.

* * * * *